G. W. McGILL,

Assignor to HOLMES, BOOTH & HAYDENS.

Buckle.

No. 9,753. Reissued June 14, 1881.

Witnesses.

J. N. Shumway

L. D. Rogers

Geo. W. McGill

Inventor

By atty.

Wm. G. Eaton

N. PETERS, Photo-Lithographer, Washington, D. C.

UNITED STATES PATENT OFFICE.

GEORGE W. McGILL, OF NEW YORK, N. Y., ASSIGNOR TO HOLMES, BOOTH & HAYDENS, OF WATERBURY, CONN.

BUCKLE.

SPECIFICATION forming part of Reissued Letters Patent No. 9,753, dated June 14, 1881.

Original No. 209,701, dated November 5, 1878. Application for reissue filed May 3, 1881.

*To all whom it may concern:*

Be it known that I, GEO. W. McGILL, of New York, in the county of New York, and State of New York, have invented a new Improvement in Buckles; and I do hereby declare the following, when taken in connection with the accompanying drawings and the letters of reference marked thereon, to be a full, clear, and exact description of the same, and which said drawings constitute part of this specification.

Figure 1:
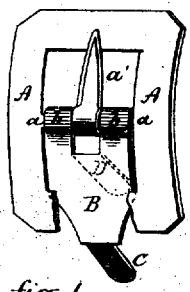
Figure 2:
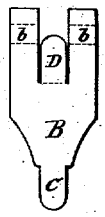
Figure 3:
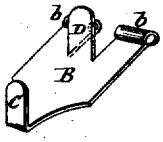
Figure 4:
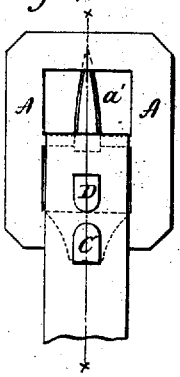
Figure 5:
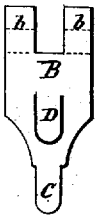
Figure 6:
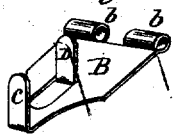
Figure 7:
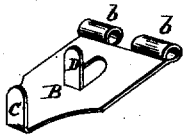

Figure 1 represents a face view of my improved buckle, showing a portion of its frame broken away to exhibit its fastening-plate. Fig. 2 represents the fastening-plate in blank. Fig. 3 represents the fastening-plate swaged and bent into finished form. Fig. 4 is a back view of the buckle attached to a strap. Figs. 5, 6, and 7 represent equivalent modifications in the construction of the fastening-plate; and Fig. 8 is a sectional view of the device, taken on the line *x x*, Fig. 4.

My invention has for its object an improved and simplified mode of fastening a buckle to a strap, or to such other article as it may be desired to attach it to; and it consists in hinging to the cross-bar of an ordinarily-constructed buckle a metallic fastening consisting of a plate having its base terminating in a central single prong, and having another prong pierced and extending from its body portion, both the base-prong and body-prong being pointed and bent down at right angles from the body of the plate in planes parallel to each other—that is, in planes at right angles to the longitudinal line of the buckle—in such manner that they will enter the article to which the buckle is to be attached through slits cut therein on lines parallel with each other, and clamp such article by being bent down on its other side, either toward or from each other, as will hereinafter fully appear.

A represents the buckle-frame, *a* its cross-bar, and *a'* the buckle-tongue hung thereon.

Figure 8:
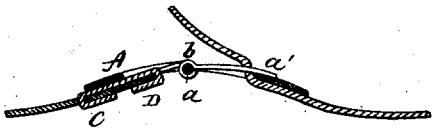

B represents the fastening-plate, which is hung on the cross-bar *a* by its arms *b b*, as shown in Figs. 1 and 8.

C and D represent the fastening-prongs, by means of which the buckle is fastened to the article to which it is desired to attach it, the prong C formed on the free end of the fastening-plate, the prong D, from the internal portion of the plate, the two prongs, when bent down, standing in planes parallel to each other—that is, in planes at right angles to the longitudinal line of the buckle. The prongs are forced through slits cut parallel to each other in the article, and bent either toward or from each other on the opposite side, which completes the attachment.

A metallic washer may be used on the prongs, if desired.

The fastening-prong D may be cut to extend from between the arms *b b*, as shown in Figs. 1, 2, 3, 4, and 8, or may be punched from the body portion of the plate, as shown in Figs. 5, 6, and 7.

I am aware that a buckle having a two-pronged plate in plane parallel to the longitudinal line of the buckle, or nearly so, in which the prongs are bent toward each other when secured to a strap or other articles, and also a clamp-buckle with tongue, having hooks so applied that the strain of the strap upon them clamps the edge of the tongue down upon the strap, are old, and such I do not claim as my invention; and, furthermore, I do not claim here anything shown in United States Letters Patent No. 172,466, issued to me January 18, 1876; but What I do claim, and desire to secure by Letters Patent, is—

The herein-described buckle, having the fastening-plate B, constructed with the prong D from the internal portion of the plate, and the prong C from the free end thereof, the plane of the prongs parallel to each other and at right angles to the longitudinal line of the buckle, and substantially as specified.

GEORGE W. McGILL.

Witnesses:

A. VON HARTLIEB,

J. H. EBERHARDT,

*Both of 20 Barbican, London, E. C., England.*